Nov. 3, 1959 F. C. LUSTIG 2,910,957
SENSING DEVICE

Filed Aug. 29, 1958 2 Sheets-Sheet 1

FRANK C. LUSTIG INVENTOR

BY Lawrence & Field

ATTORNEY

Nov. 3, 1959

F. C. LUSTIG 2,910,957

SENSING DEVICE

Filed Aug. 29, 1958

INVENTOR
FRANK C. LUSTIG.

BY *Lawrence I Field*

ATTORNEY

United States Patent Office 2,910,957
Patented Nov. 3, 1959

2,910,957

SENSING DEVICE

Frank C. Lustig, Highland Park, Ill., assignor to Revere Camera Company, a corporation of Delaware Application August 29, 1958, Serial No. 757,955

3 Claims. (Cl. 116—114)

This invention relates to motion picture cameras and more particularly to a means for physically sensing whether film is being fed properly in magazine type cameras, as for example in 8 mm. magazine type cameras.

In 8 mm. magazine type motion picture cameras one of the more frustrating and disappointing experiences is to learn (after the film has been developed) that a magazine of film believed to have been exposed, in reality did not feed through the camera owning to a mechanical failure usually incidental to the loading of the magazine into the camera either for the exposure of the first or second half of the contents of the magazine.

By the present invention a simple and effective means is provided whereby the photographer may physically feel and hear an indicator actuated by the passage of film from a payoff reel to a takeup reel, thereby assuring the operator that exposure is actually occurring and avoiding his prior art experience in which he has often been misled by the sound made by the running of the camera mechanism into belief that film was fed through the camera.

In the past, means have been devised principally in conjunction with footage indicators to be used with manually operated still cameras or spool fed cameras to permit the user to sense the movement of film through the camera, as for example are shown in expired U.S. Patents 1,979,984; 2,027,007 and 2,213,741.

To avoid direct contact with the film, one type of prior art feelable indicator has been driven directly by the camera mechanism. For example, in both Patents 1,979,984 and 2,027,007 the feelable indicator is actuated by a part of the camera mechanism and will indicate a footage whether or not film has actually been exposed. The disadvantages of such indicators are manifest. Thus, if the sprocket holes in the film are damaged, or the film is otherwise jammed in the camera, in each of the devices shown the camera mechanism would continue to run and the pulsations would continue to be felt by the user even though no film is actually being transported through the camera. To overcome the deficiencies in such indicators, efforts have been made to contact the film directly to give a more certain indication of film movement. One such indicator is shown in Patent 2,213,-741 wherein the feelable indicator contacts the film itself, or protuberances or perforations on or in the film itself. It is to be noted that in each of the prior art patents, the feelable indicator is used in conjunction with open reels or spools of film, and not with the film encased in a light-tight magazine. The sensing means devised for such cameras are wholly unsuited to use in magazine type cameras. As is well known, in magazine type cameras the film is unwound from one spool within the magazine and wound onto another spool within the magazine casing and hence direct contact between the film and a feelable indicator as in Patent 2,213,741 is virtually impossible.

Furthermore feelable sensing means in direct contact with the film or film sprocket holes are objectionable because they may cause tearing in the film or jamming of the film.

One object of the present invention is to provide a positive means for assuring the photographer that film is actually being paid out and taken up, when the photographer is endeavoring to take pictures with a magazine type camera.

Another object is to provide means through which the user of the camera may feel and physically sense the movement of film through the camera.

Another object of the invention is to provide a feelable indicator which does not contact the film directly and which is not actuated by the camera mechanism directly but is instead actuated by driven means carried on the film magazine spool.

These and other objects will become apparent from the following description and drawings in which.

Figure 3:
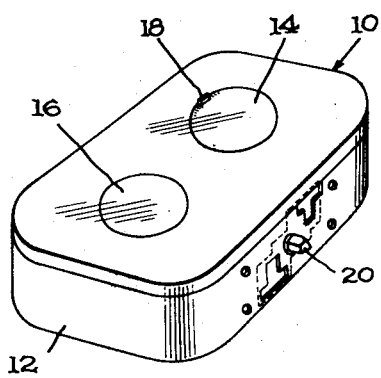
Figure 3 is a perspective view of a conventional 8 mm. magazine film package.
Figure 4:
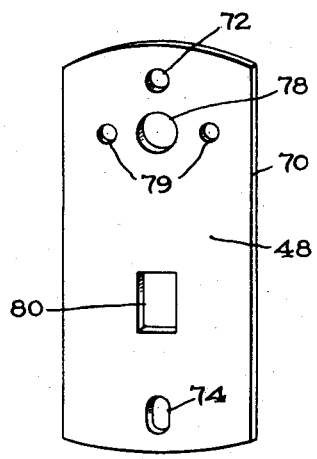
Figure 4 is a detailed perspective view of one form of cover plate in the sensing devices of Figures 1 and 2.
Figure 5:
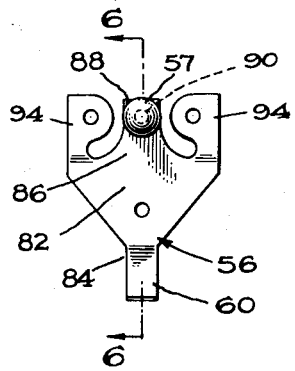
Figure 5 is a front elevational detailed view of one form of leaf spring in the sensing device of Figures 1 and 2.
Figure 6:
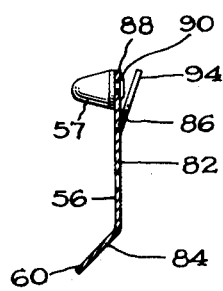
Figure 6 is a section of the device of Figure 5, taken along line 6—6.

The magazine 10 shown in Figure 3 is intended to represent the usual 8 mm. movie film magazine commercially available, and similar in many respects to the magazine shown in U.S. Patent 2,241,265. It comprises an outer casing 12 within which there are disposed two spools or cores 14 and 16, adapted to support the film. Each of the spools has secured to it, an end of the film to be exposed. In operation unexposed film is unwound from one spool from which the film is payed out past a finger which engages openings in the film and causes it to move past an exposure aperture and thence passes onto the other spool which reels in the exposed film. The magazine is also provided with a pointed square protuberance 20 centrally disposed on the forwardly facing surface of the magazine. Protuberance is adapted to seat in a recess built into the camera case and it is believed that occasional failure of this square member to turn approximately 90° when it is inserted in the recess provided results in improper seating and prevents the opening of the exposure orifice by means driven by the rotation of the pin 20. Occurrence of this results in failure of the finger to feed the film past the exposure orifice.

Each of the cores is provided with an upstruck tab 18 situated on opposite sides of the magazine. The upstruck tab 18 on the takeup core is engaged by the driving means and the upstruck tab on the payout core, on the other side of the magazine, is rotated in a path wherein it intermittently makes physical contact with the sensing means about to be described. Thus when film is being unwound the cores rotate and the tabs also rotate.

Figure 1:
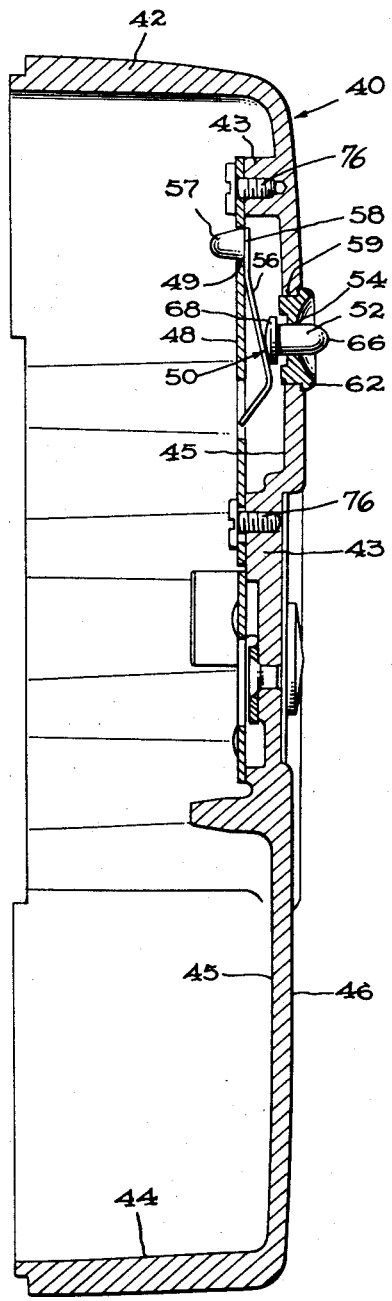
Figure 1 is a view in section taken through a portion of a door of an 8 mm. camera, before a magazine has been loaded into the camera, showing the sensing device in an uncocked position.
Figure 2:
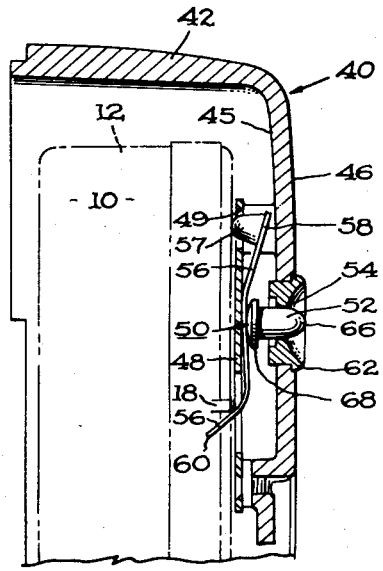
Figure 2 is a fragmentary view in section of the same structure, after a magazine has been loaded into the camera, showing the sensing device in its operative position.

In Figures 1 and 2 there is shown a portion of a door 40 which together with a partition plate in the camera separating the mechanism from the magazine, generally defines a magazine receiving chamber. Door 40, as shown has an upper portion 42, a lower portion 44 and a side portion 46. On its inner surface 45, the door is provided with bosses 43 adapted to support a cover plate 48 as shown in Figure 1 is spaced from the inside of the door and which, with the door defines a cavity which is provided to house and protect the delicate sensing means 50 of the present invention. Essentially the sensing means includes (1) a retractable pin 52 adapted to protrude through an aperture 54 in the side of the door, and hence adapted to be fingered by the photographer when pictures are being taken and (2) a leaf spring 56 which has one free end 60 extending inwardly into the magazine chamber and a second end 58 to which there is secured a magazine engaging pin 57, extending through an aperture 49 in cover plate 48.

Cover plate 48 consists of a flat planar body portion 70 provided with widely spaced holes 72 and 74 through which screws 76 may pass to secure plate 48 to elevated bosses 43 of the casing 40 as shown in Figure 1. Plate 70 is also provided with openings 78, 79 and 80 for the assembly and functioning of the sensing means: pin 52 and leaf spring 56, carrying pin 57.

Leaf spring 56 consists of a straight middle body portion 82 joining a lower section 84 which terminates in a bent free end portion 60 extending through opening 80 in the cover plate and into the magazine chamber, and a bifurcated upper portion 86 in the shape of a trident consisting of ears 94 on either side of a centrally located tab 88. The centrally disposed tab 88 is located in the plane of portion 82 and is pierced with a hole 90 adapted to receive means for securing the leaf spring to magazine engaging pin 57. The two ears 94 are slightly offset from the plane of body portion 82 and serve as the means for securing leaf spring 56 to cover plate 48, e.g. by rivets 98, received in holes 79. The offset in ears 94 insures that the free end portion 60 is urged into the path of travel of the tab 18 of the magazine film payout spool, when pin 57 is retracted by contact with a magazine.

Figure 7:
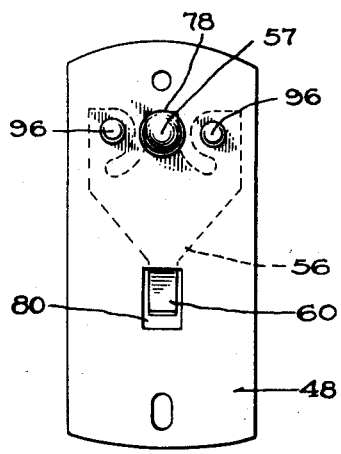
Figure 7 is an elevational view of the assembly of the cover plate and leaf spring of Figs. 4 and 5 respectively.
Figure 8:
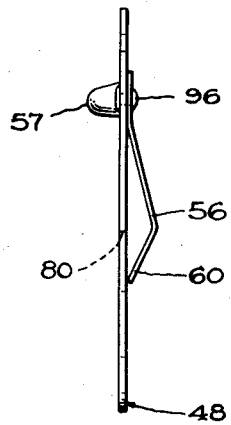
Figure 8 is a side elevational view of the assembly of Figure 7.

Figures 7 and 8 show cover plate 48 and leaf spring 56 after they have been joined to one another by rivets 96 or other suitable means. It will be noted that the tip of leaf spring 56 is free to pass through hole 80 and that pin 57 extends through hole 78 in the cover plate 48.

A mounting bushing 62 positioned in aperture 59 in the side 46 of the door, defines a passage 54 through which pin 52 extends. The outwardly extending portion of pin 52 has a smooth rounded configuration terminating in a blunt tip 66, not unpleasant to the touch. The inner end of pin 52 carries a head 68 against which leaf spring 56 continually presses.

Loading a magazine into the camera and closing and latching the door 40 causes the sensing device to shift from the position shown in Figure 1 to the position shown in Figure 2. In Figure 1 leaf spring 56 is uncocked and is virtually completely free of restraint, this being necessary to protect the sensitive spring from handling and deformation. In Figure 2, the magazine bears on pin 57 and causes it to retract, thereby urging leaf spring 56 into the position shown wherein its free end 60 is now closely adjacent tab 18 on the magazine, and actually in the path of travel of the tab as it rotates. The spring is designed so that pressure on tip 66 will not prevent core 14 from unwinding and hence the spring will not jam the camera.

As film is thereafter paid out by the upper reel, exposed and taken up by the lower reel, the tab 18 rotates and intermittently makes physical contact with the free end 60 of the spring 56. The sound made by such intermittent engagement and the sensation transmitted by button are both communicated to the photographer.

When, owing to various mechanical defects film is not properly taken off from the payout spool and fed onto the takeup spool no audible or tactile signal is received by the photographer and he is accordingly made aware that no film has been passing from one reel to the other.

While but a single leaf 56 has been shown on the camera, it will be understood that a plurality of such leaves may be provided for the same purpose, if more numerous signals are desired.

Instead of being mounted on a hingedly mounted door, it is evident that the sensing device of the present invention could be supported by other closure members adapted to create a lighttight magazine receiving chamber, without departing from the scope of the present invention.

From the foregoing it will be seen that a simple, positive means has been provided to assure the photographer that film is feeding through his 8 mm. magazine camera, and that when he develops the film it will have already been exposed.

I claim:

1. In a magazine-type movie camera wherein unexposed film contained in a magazine is transferred from a payout spool past an exposure aperture and thence to a take-up spool, and wherein the takeup spool core terminates in a tab which serves as the connection to the drive means and the payout spool core terminates in a tab extending outwardly from the opposite face of the magazine and forming a continuation of said core, rotating with said core during the transfer of film from the payout spool to the take-up spool; the improved means for sensing said film transfer which comprises: the combination of a bushing in the casing of said camera, a pin adapted to extend through said bushing and having an outer end protruding through the said casing and an inner end extending inwardly into said casing; a plate secured to a raised portion of said casing, and defining a chamber between one face of said plate and the inner surface of said casing; a leaf spring positioned in the chamber defined by said plate and said casing, said leaf spring consisting of a generally planar central portion between a first bent free-end portion and a second end portion bent out of the plane of the central portion; the planar central portion being urged into physical contact with the inner end of said pin by means restraining one of said bent end portions; one of said bent end portions being adapted to extend through an opening in said plate so as to be positioned in the path of the rotatable extension of the payout spool core and to be struck by same when the extension rotates with the core and to thereby impart a movement to said pin, through displacement of said central portion of said leaf spring concurrently with the displacement of said free-end by the rotatable extension of the payout spool.

2. The combination of claim 1 wherein the cover plate is secured to at least two bosses on the inner surface of the camera casing and is formed with a portion adapted to receive means securing one end of the leaf spring and with a plurality of apertures through which the terminal portions of the leaf spring are free to extend.

3. The combination of claim 1 wherein free movement of the leaf spring is restrained in part by means securing a portion of the second end portion of said leaf spring to the plate.

References Cited in the file of this patent

UNITED STATES PATENTS 2,124,887     Moomaw             July 26, 1938